United States Patent
Mukai (10) Patent No.: US 9,685,836 B2
(45) Date of Patent: Jun. 20, 2017

(54) MOTOR ABLE TO PREVENT ENTRY OF FOREIGN MATTER INSIDE HOUSING

(71) Applicant: FANUC CORPORATION, Yamanashi (JP)

(72) Inventor: Yasuhito Mukai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 44 days.

(21) Appl. No.: 14/922,312

(22) Filed: Oct. 26, 2015

(65) Prior Publication Data

US 2016/0118856 A1   Apr. 28, 2016

(30) Foreign Application Priority Data

Oct. 27, 2014   (JP) .................................. 2014-218626

(51) Int. Cl.
*H02K 5/16*      (2006.01)
*F16C 35/04*     (2006.01)
(Continued)

(52) U.S. Cl.
CPC ........... *H02K 5/161* (2013.01); *F16C 33/762* (2013.01); *F16C 33/768* (2013.01);
(Continued)

(58) Field of Classification Search
CPC ........ H02K 5/1732; H02K 5/20; H02K 5/161; H02K 5/15
(Continued)

(56) References Cited

U.S. PATENT DOCUMENTS 4,429,924 A * 2/1984 Franz ................... H02K 5/1732
                                                 123/196 R
7,417,344 B2 * 8/2008 Bradfield ............. H02K 5/1732
                                                 310/90
(Continued)

FOREIGN PATENT DOCUMENTS

JP          62198839 U    12/1987
JP           6388051 U     6/1988
(Continued)

OTHER PUBLICATIONS

English Abstract and Machine Translation for Japanese Publication No. 2006-353053, published Dec. 28, 2006, 9 pgs.
(Continued)

*Primary Examiner* — Thanh Lam
(74) *Attorney, Agent, or Firm* — Fredrickson & Byron, P.A.

(57) ABSTRACT

A motor which prevents the generation of noise from a bearing and prevents shortening of the life of the bearing while preventing the entry of foreign matter inside of a housing. The motor 10 includes a rotor 12, a stator 16, a bearing 20, a housing 18, a bearing support surface 60 arranged to be immovable relative to the housing 18 and surrounding an outer circumferential surface 58 of the bearing 20, a first groove 62 formed at the outer circumferential surface 58 of the bearing 20 or at the bearing support surface 60, and a second groove formed at the outer circumferential surface 58 of the bearing 20 or at the bearing support surface 60 to extend in a circumferential direction so as to intersect the first groove 62.

7 Claims, 8 Drawing Sheets

(51) Int. Cl.
    *F16C 33/76*     (2006.01)
    *F16C 35/077*     (2006.01)
    *F16C 19/06*     (2006.01)

(52) U.S. Cl.
    CPC .......... *F16C 35/042* (2013.01); *F16C 35/077* (2013.01); *F16C 19/06* (2013.01); *F16C 2380/26* (2013.01)

(58) Field of Classification Search
    USPC .................................................. 310/89–90
    See application file for complete search history.

(56) References Cited

U.S. PATENT DOCUMENTS

| | | | | |
|---|---|---|---|---|
| 8,659,215 | B2* | 2/2014 | Nagayama | H02K 5/1732 310/401 |
| 2003/0189382 | A1* | 10/2003 | Tornquist | F16C 25/08 310/90 |
| 2005/0082941 | A1* | 4/2005 | Iida | H02K 1/28 310/54 |
| 2007/0273228 | A1* | 11/2007 | Tanaka | H02K 5/1732 310/90 |
| 2008/0166076 | A1* | 7/2008 | Stout | F16C 27/04 384/99 |
| 2009/0015085 | A1* | 1/2009 | Nakajima | F16F 15/0237 310/90 |

FOREIGN PATENT DOCUMENTS

| | | |
|---|---|---|
| JP | 251050 U | 4/1990 |
| JP | 2006353053 A | 12/2006 |
| JP | 2007105850 A | 4/2007 |

OTHER PUBLICATIONS

English Machine Translation for Japanese Publication No. 63-088051 U, published Jun. 8, 1988, 3 pgs.
English Machine Translation for Japanese Publication No. 62-198839 U, published Dec. 17, 1987, 2 pgs.
English Abstract for Japanese Publication No. 2007-105850 A, published Apr. 26, 2007, 19 pgs.
English bibliographic information for Japanese Publication No. 2-51050 U, published Apr. 10, 1990, 1 pg.
Untranslated Notification of Reasons for Refusal mailed by JPO in Japanese Application No. 2014-218626, Mar. 1, 2016, 2 pages.
English machine translation of Notification of Reasons for Refusal mailed by JPO in Japanese Application No. 2014-218626, Mar. 1, 2016, 2016, 2 pages.
Untranslated Decision to Grant a Patent mailed by JPO in Japanese Application No. 2014-218626, Jun. 14, 2016, 3 pages.
English machine translation of Decision to Grant a Patent mailed by JPO in Japanese Application No. 2014-218626, Jun. 14, 2016, 3 pages.

* cited by examiner

MOTOR ABLE TO PREVENT ENTRY OF FOREIGN MATTER INSIDE HOUSING

BACKGROUND OF THE INVENTION

1. Field of the Invention

The invention relates to a motor able to prevent entry of foreign matter to the inside of a housing.

2. Description of the Related Art

In a motor, it is necessary to prevent washing water, cutting oil, or other foreign matter from entering the inner space of a housing in which a rotor is held. In the past, the art has been known of providing an air passage in the housing and discharging compressed air through the air passage from the inside of the housing to the outside so as to prevent the entry of foreign matter to the inner space of the housing (for example, see Japanese Patent Publication No. 2007-105850A and Japanese Utility Model Publication No. 2-051050U).

To prevent the entry of foreign matter to the inner space of a housing, it is necessary to discharge the compressed fluid at a position closer to the rotary shaft. However, in a conventional motor, if providing an air passage, the strength of the bearing which supports the rotary shaft ends up being affected. This is liable to lead to generation of abnormal noise from the bearing and shortening of the lifetime of the bearing.

SUMMARY OF THE INVENTION

In one aspect of the invention, a motor comprises a rotor which includes a rotary shaft, a stator which is arranged at radially outward of the rotor, a bearing which supports the rotary shaft to be able to rotate, and a housing which supports the stator and defines an inner space which houses the rotor together with the stator.

Further, the motor comprises a bearing support surface which is arranged to be immovable with respect to the housing and which surrounds an outer circumferential surface of the bearing so as to support the bearing; a first groove which is formed at the outer circumferential surface of the bearing or at the bearing support surface, and which is in fluid communication with the inner space at its one end and with an outside space of the housing at its other end; and a second groove which is formed at the outer circumferential surface of the bearing or at the bearing support surface and which extends in a circumferential direction of the rotary shaft so as to intersect the first groove.

The bearing support surface may be formed at the housing. The motor may further comprise an annular member which is arranged between the housing and the bearing, and which includes the bearing support surface at its inner circumference. The first groove may linearly extend in an axial direction of the rotary shaft.

The second groove may extend over the entire circumference of the outer circumferential surface of the bearing or the bearing support surface. Both of the first groove and the second groove may be formed at one of the outer circumferential surface of the bearing and the bearing support surface.

The housing may include a first housing part which is fixed to one end of the stator in the axial direction, and a second housing part which is fixed to the other end of the stator in the axial direction. The bearing may be arranged at the one side of the stator in the axial direction. The second housing part may be formed with an air hole which connects the inner space and the outside space so as to be in fluid communication with each other.

BRIEF DESCRIPTION OF THE DRAWINGS

These and other objects, features, and advantages of the invention will be clarified by the following preferred embodiments with reference to the attached drawings, in which.

DESCRIPTION OF THE PREFERRED EMBODIMENTS

Below, embodiments of the invention will be explained in detail based on the drawings. First, referring to FIG. 1, a motor 10 according to an embodiment of the invention will be explained. Note that, in the following explanation, the "axial direction" indicates the direction along a rotation axis O of a rotary shaft 13, the "radial direction" indicates the direction of a radius of a circle centered about the axis O, and the "circumferential direction" indicates the circumferential direction of the circle centered about the axis O. Further, for convenience, leftward in FIG. 1 will be explained as frontward in the axial direction (or axially frontward).

Figure 1:
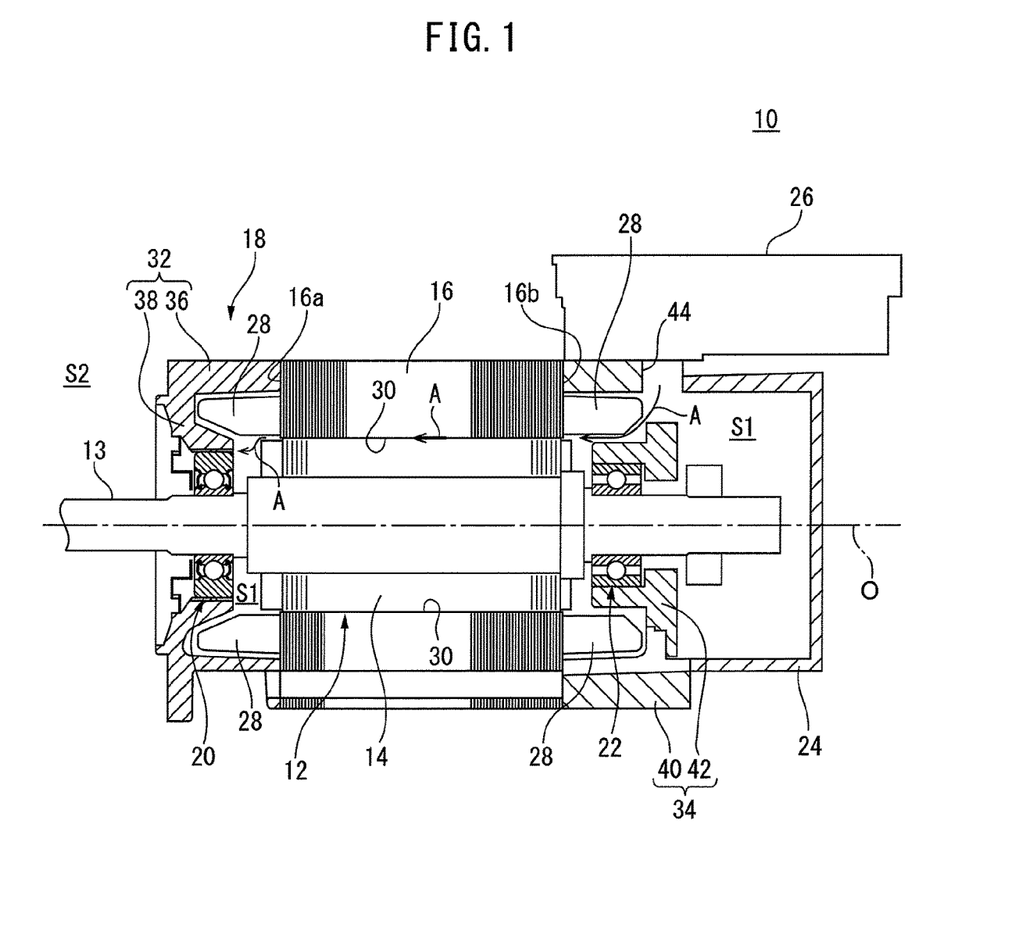
FIG. 1 is a side cross-sectional view of a motor according to an embodiment of the invention.

The motor 10 includes a rotor 12, stator 16, housing 18, first bearing 20, second bearing 22, rear cover 24, and terminal box 26. The stator 16 is fabricated from a plurality of magnetic steel sheets stacked in the axial direction. A coil 28 is wound in the stator 16.

The rotor 12 includes a rotary shaft 13, and a rotor core 14 fixed to the radially outside of the rotary shaft 13 and having a plurality of magnets (not shown) therein. The rotor core 14 is arranged to be slightly separated radially inward from the stator 16. Therefore, a small gap 30 is formed between the outer circumferential surface of the rotor core 14 and the inner circumferential surface of the stator 16.

The housing 18 supports the stator 16. Specifically, the housing 18 includes a front housing (first housing part) 32 fixed to the axially front side of the stator 16, and a rear housing (second housing part) 34 fixed to the axially rear side of the stator 16.

The front housing 32 includes an annular main body 36 and a flange 38 extending from the axially front end of the main body 36 toward radially inside. The front housing 32 is fixed to the axially front end face 16a of the stator 16 at the axially rear end of the main body 36.

The rear housing 34 includes an annular main body 40 fixed to an axially rear end face 16b of the stator 16, and an annular bearing support part 42 fixed to the radially inside of the main body 40. At the main body 40 of the rear housing 34, an air hole 44 which passes through the main body 40 is formed. This air hole 44 connects an inner space S1 and an outside space S2 of the rear housing 34 so as to be in fluid communication with each other.

The rear cover 24 is fixed to the axially rear end of the main body 40 of the rear housing 34. In this embodiment, the rotor core 14 of the rotor 12 is housed in the inner space S1 defined by the front housing 32, rear housing 34, stator 16, and rear cover 24.

The first bearing 20 is inserted between the flange 38 of the front housing 32 and the rotary shaft 13, and supports the rotary shaft 13 to be able to rotate. Note that, the support structure of the first bearing 20 will be explained later.

On the other hand, the second bearing 22 is inserted between the bearing support part 42 of the rear housing 34 and the rotary shaft 13, and supports the rotary shaft 13 to be able to rotate, similar as the first bearing 20.

The terminal box 26 is fixed on the outer circumferential surface of the rear housing 34. A power cable (not shown) for supplying power to the coil 28 and a fluid feed pipe (not shown) for feeding compressed fluid to the inner space S1 are led into the terminal box 26.

The fluid feed pipe is connected to the air hole 44 formed at the rear housing 34 at one end of the fluid feed pipe, while connected to a fluid feed device (not shown) installed outside of the motor 10 at the other end of the fluid feed pipe. The fluid feed device introduces the compressed fluid into the inner space S1 through the fluid feed pipe and air hole 44. The compressed fluid is e.g. a compressed gas.

Figure 3:
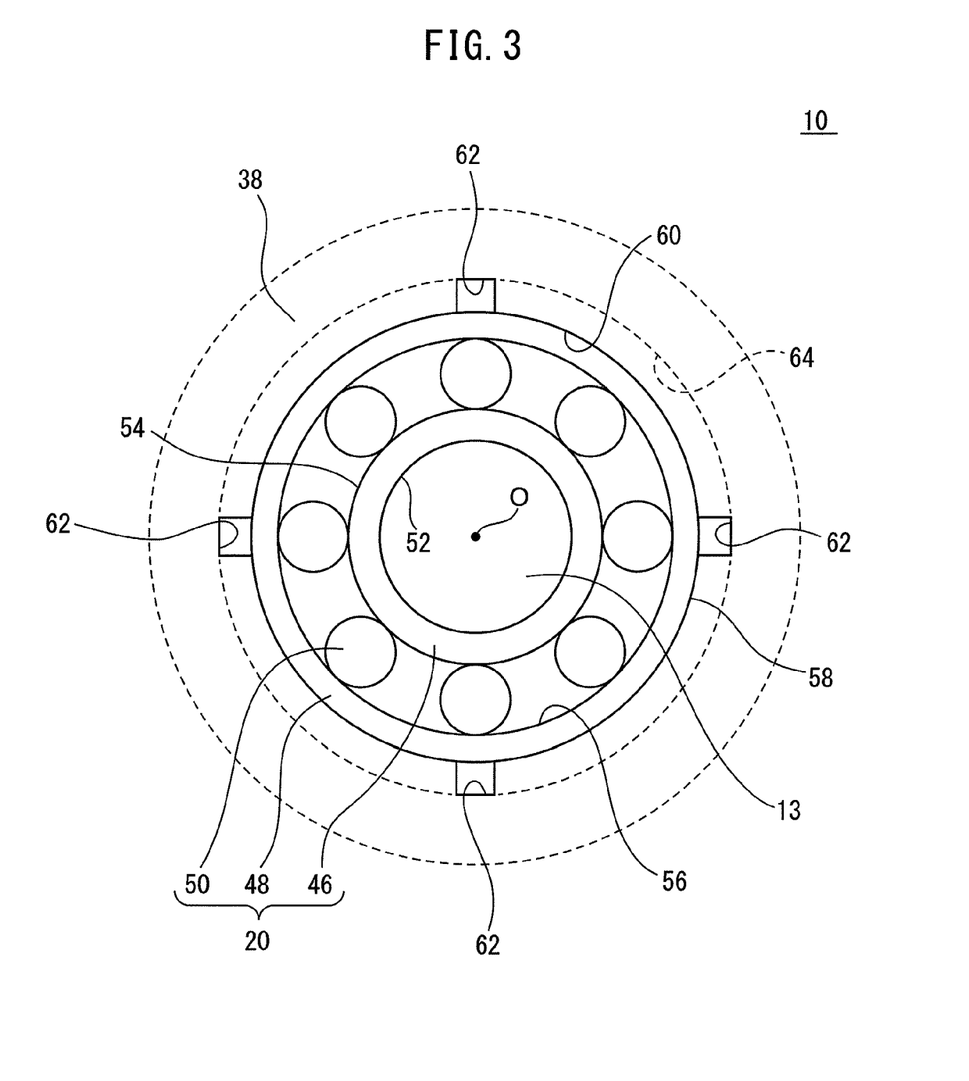
FIG. 3 is an enlarged view of the rotary shaft, first bearing, and flange shown in FIG. 2 as seen from the front in the axial direction, i.e., the direction of the arrow III in FIG. 2.
Figure 4:
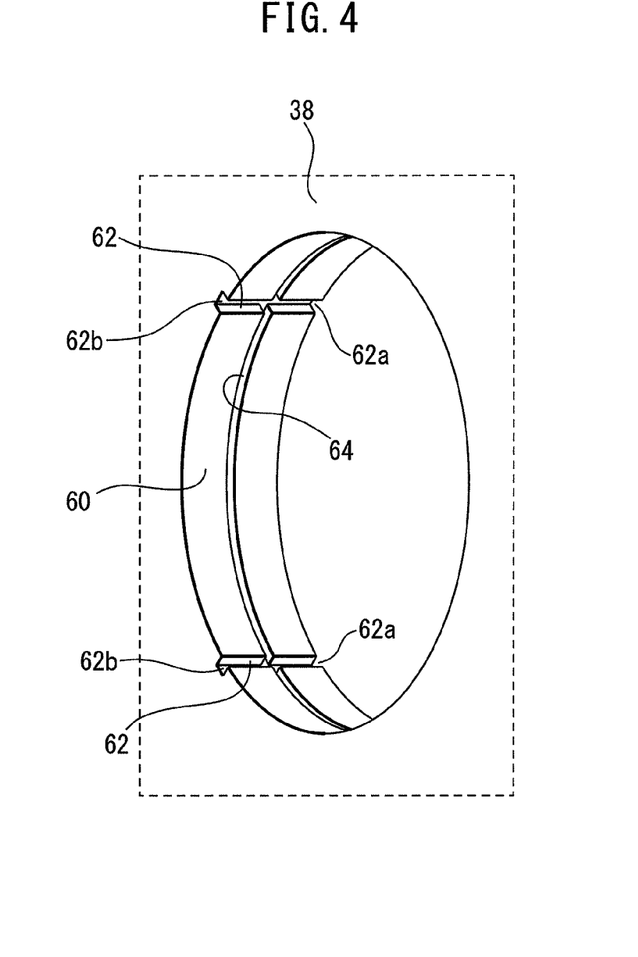
FIG. 4 is a perspective view of the bearing support surface shown in FIG. 3.

Next, referring to FIG. 2 to FIG. 4, the configurations of the flange 38 of the front housing 32 and the first bearing 20 will be explained. The first bearing 20 is a ball bearing including an inner race 46, outer race 48, and a plurality of balls 50 arranged between the inner race 46 and outer race 48.

The inner race 46 is an annular member having an inner circumferential surface 52 and an outer circumferential surface 54 opposite the inner circumferential surface 52. The rotary shaft 13 is fit into the inner race 46 so as to contact the inner circumferential surface 52 of the inner race 46. The outer circumferential surface 54 of the inner race 46 functions as a raceway surface, and the balls 50 roll on the outer circumferential surface 54.

The outer race 48 is an annular member with a larger diameter than the inner race 46, and has an inner circumferential surface 56 and an outer circumferential surface 58 opposite the inner circumferential surface 56. The inner circumferential surface 56 of the outer race 48 functions as a raceway surface, and the balls 50 roll on the inner circumferential surface 56. The outer circumferential surface 58 of the outer race 48 defines an outer circumferential surface of the first bearing 20, and is surrounded by the flange 38 of the front housing 32, as explained below.

The flange 38 of the front housing 32 has a cylindrical bearing support surface 60 at its radially inner end. The bearing support surface 60 surrounds the outer circumferential surface 58 of the outer race 48 from radially outside so as to contact the outer circumferential surface 58. By the bearing support surface 60, the first bearing 20 is supported at radially inside of flange 38.

An annular wall 66 is fixed to the flange 38. The annular wall 66 is arranged at axially frontward of the first bearing 20, and defines the space 68 and gap 69 together with the first bearing 20.

The motor 10 according to this embodiment includes first grooves 62 and a second groove 64 which are formed on the bearing support surface 60. The first grooves 62 are formed to be recessed radially outward from the bearing support surface 60, and linearly extend in the axial direction from the axially rear end to the axially front end of the bearing support surface 60.

The first grooves 62 are in fluid communication with the inner space S1 at its axially rear end 62a, while are in fluid communication with the outside space S2 of the housing 18 at its axially front end 62b through the space 68 and gap 69. In this embodiment, a total of four first grooves 62 are provided so as to be arranged in the circumferential direction at substantially equal intervals (i.e., 90°).

The second groove 64 is formed so as to be recessed radially outward from the bearing support surface 60, and extends in the circumferential direction. Specifically, the second groove 64 extends over the entire circumference of the bearing support surface 60 so as to intersect with all of the first grooves 62. Here, the second groove 64 is arranged at an axial direction position the same as the raceway of the balls 50 on the inner circumferential surface 56 of the outer race 48, i.e., the position where the inner circumferential surface 56 of the outer race 48 and the balls 50 contact each other.

In this embodiment, the balls 50 are arranged at the center part in the axial direction of the first bearing 20, and therefore the raceway of the balls 50 on the inner circumferential surface 56 of the outer race 48 is also arranged at the center part in the axial direction of the first bearing 20. Therefore, the second groove 64 according to this embodiment is arranged at the center part in the axial direction of the bearing support surface 60.

Next, the function of the motor 10 according to this embodiment will be explained. In order to prevent entry of foreign matter into the inner space S1 during operation of the motor 10, compressed fluid is introduced into the inner space S1 from the fluid feed pipe in the terminal box 26 through the air hole 44.

Figure 2:
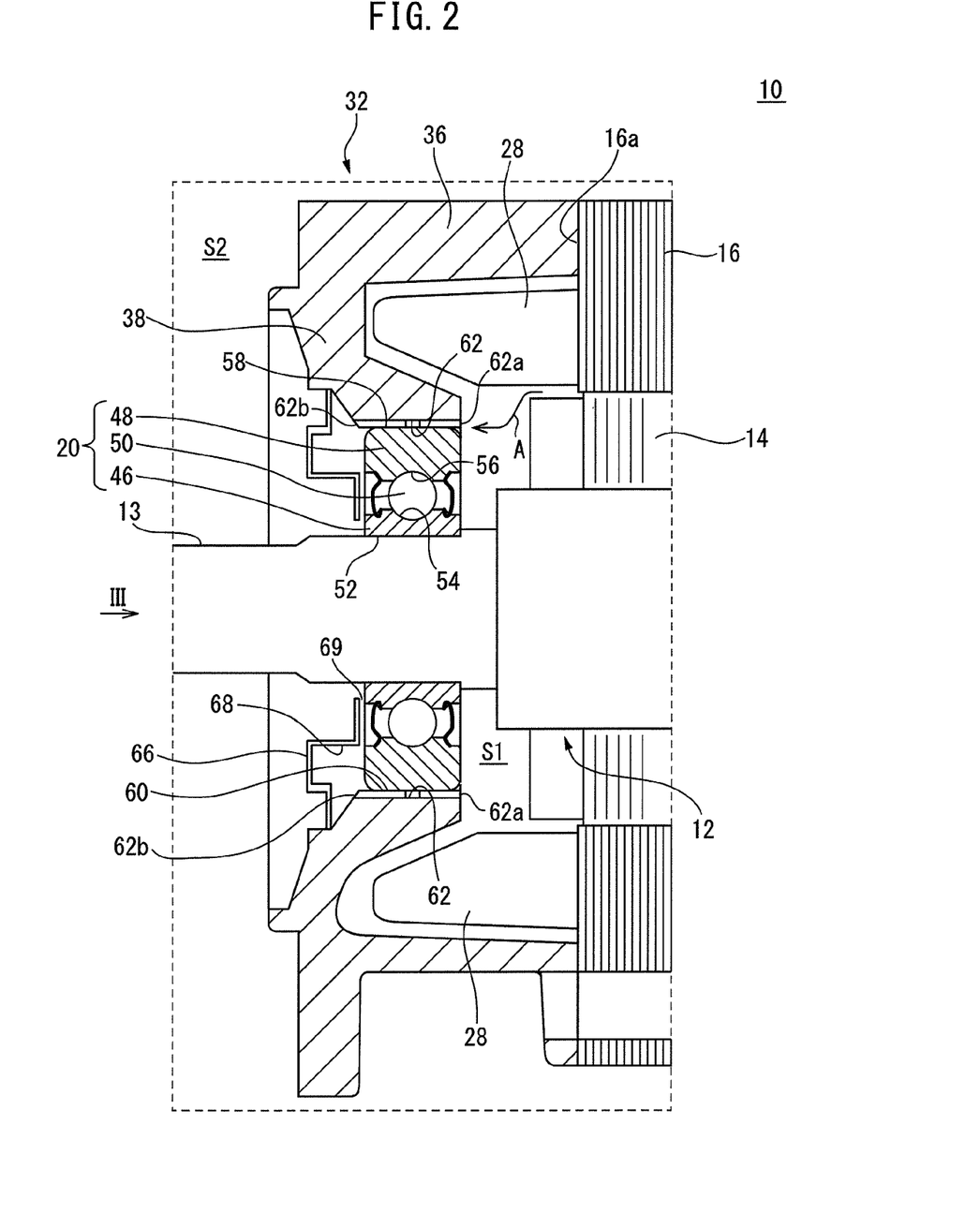
FIG. 2 is a partial enlarged view which enlarges a section in FIG. 1.

The compressed fluid introduced into the inner space S1 from the air hole 44 passes through the gap 30, and flows into the part of the inner space S1 at the axially rear side of the first bearing 20, as indicated by the arrows A in FIG. 1 and FIG. 2.

Then, the compressed fluid passes through the first grooves 62 and flows into the space 68. Then, the compressed fluid flown into the space 68 passes through the gap 69, and is blown to the rotary shaft 13 so as to be discharged to the outside space S2. By the compressed fluid discharged in this way, the foreign matter is prevented from entering through the gap 69.

During operation of the motor 10, the balls 50 roll on the raceway surfaces (i.e., the outer circumferential surface 54 of inner race 46 and inner circumferential surface 56 of outer race 48) of the first bearing 20. According to this embodiment, due to the second groove 64 formed so as to extend in the circumferential direction, it is possible to reduce the fluctuation in force acting on the first bearing 20, which occurs due to the first grooves 62 during operation of the motor 10.

This function will be explained below. Here, assuming the case where the second groove 64 is not formed. In this case, the outer race 48 does not contact the bearing support surface 60 at the positions of the first grooves 62. Therefore, the force for pressing the first bearing 20 from radially outside by the bearing support surface 60 is slightly weakened at the positions of the bearing support surface 60 where the first grooves 62 are formed.

When the balls 50 roll on the raceway surfaces in such a state, every time the ball 50 passes the positions of the raceway surfaces corresponding to the first groove 62, the outer race 48 bends slightly. As a result, a ripple occurs in the force applied to the first bearing 20 during operation of the motor 10, whereby the strength of the first bearing 20 is affected.

In order to address this mater, in this embodiment, the bearing support surface 60 is formed with the second groove 64 extending in the circumferential direction. Due to this second groove 64, the outer race 48 will not contact the bearing support surface 60 not only at the positions of the first grooves 62 but over the entire circumference of the bearing support surface 60. Due to this configuration, it is possible to reduce fluctuations in the force applied to the first bearing 20 during operation of the motor 10, which occurs due to the first grooves 62.

Therefore, it is possible to arrange the first grooves 62 for passage of the compressed gas near the rotary shaft 13, while eliminating the effect on the strength of the first bearing 20 derived from the first grooves 62. As a result, it is possible to effectively prevent the entry of foreign matter into the inner space S1, while preventing the generation of noise from the first bearing 20 and realizing longer life of the first bearing 20.

Further, according to this embodiment, the first grooves 62 and second groove 64 can be easily formed by processing the flange 38 of the front housing 32, so the cost of production of the motor 10 can be decreased.

Further, in this embodiment, the second groove 64 is arranged at the same axial direction position as the raceway of the balls 50 which roll on the raceway surfaces. According to this configuration, it is possible to more effectively reduce the fluctuation in the force applied to the first bearing 2 due to the first grooves 62.

Further, in this embodiment, the first grooves 62 are formed in a straight line in the axial direction, so the pressure loss of the compressed fluid passing through the first grooves 62 can be reduced. Accordingly, it is possible to efficiently discharge the compressed fluid introduced into the inner space S1 to the outside space S3.

Figure 5:
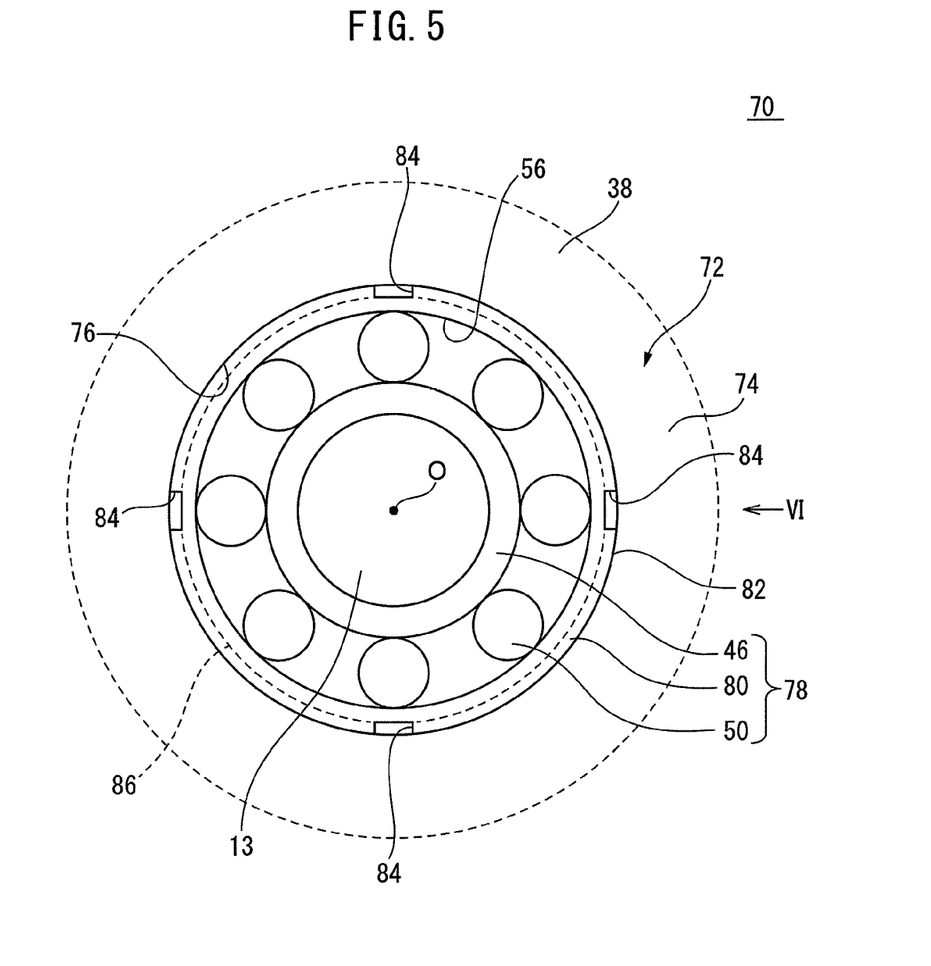
FIG. 5 is an enlarged view of a rotary shaft, first bearing, and flange of a motor according to another embodiment of the invention as seen from the front in the axial direction and corresponds to FIG. 3.
Figure 6:
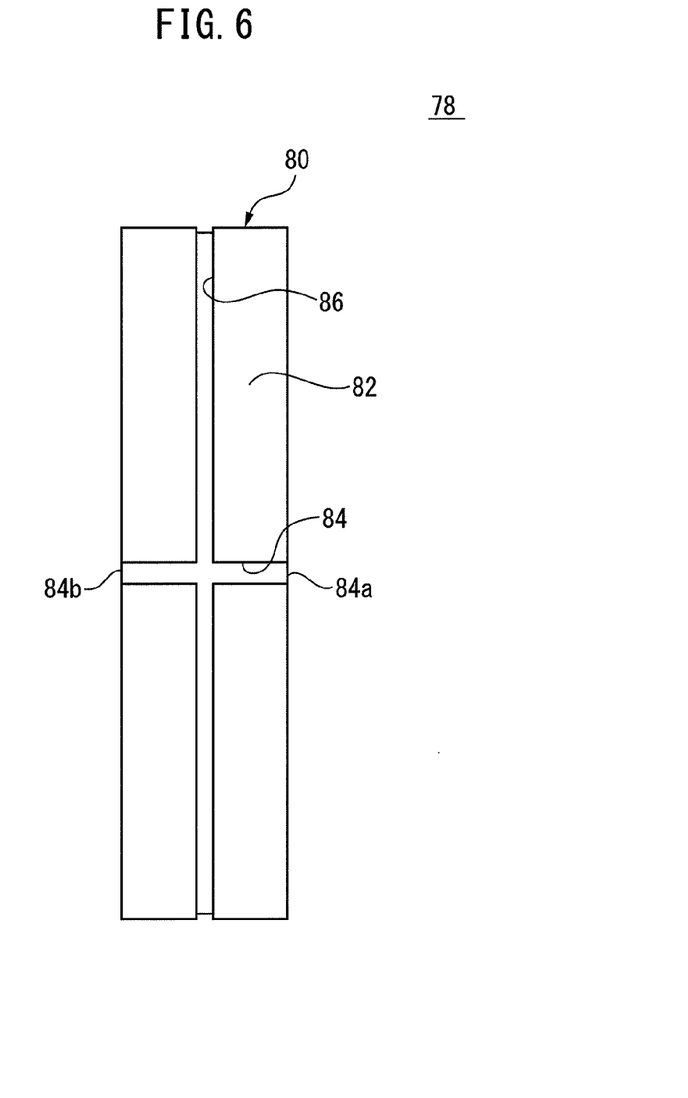
FIG. 6 is a view of the first bearing shown in FIG. 5 as seen from the direction of arrow IV in FIG. 5.

Next, referring to FIG. 5 and FIG. 6, a motor 70 according to another embodiment of the invention will be explained. Note that, in various embodiments explained below, elements similar to the already-mentioned embodiment will be assigned the same reference numerals, and detailed explanations thereof will be omitted.

The motor 70 according to this embodiment is different from the above-mentioned motor 10 in the following feature. In the motor 70, a first grooves 84 and second groove 86 are formed not at a bearing support surface 76 provided at a flange 74 of a front housing 72, but at an outer circumferential surface of a first bearing 78.

Specifically, the front housing 72 of the motor 70 includes the flange 74 which having the cylindrical bearing support surface 76 at the radially inner end of the flange 74. This bearing support surface 76 contacts the outer circumferential surface of the first bearing 78, and supports the first bearing 78.

The first bearing 78 is a ball bearing including the inner race 46, an outer race 80, and the plurality of balls 50. The outer race 80 has the inner circumferential surface 56 and an outer circumferential surface 82 opposite the inner circumferential surface 56. The outer circumferential surface 82 of the outer race 80 defines the outer circumferential surface of the first bearing 78, and is surrounded and supported by the bearing support surface 76 of the flange 74.

The motor 70 includes first grooves 84 and a second groove 86 which are formed at the outer circumferential surface 82 of the outer race 80. The first grooves 84 are formed so as to be recessed radially inward from the outer circumferential surface 82, and linearly extend from the axially rear end to the axially front end of the outer race 80.

Similar to the above-mentioned first grooves 62, the first grooves 84 is formed to be in communication with the inner space S1 at their axially rear ends 84a, while in fluid communication with the outside space S2 at their axially front ends 84b via the space 68 and gap 69. In this embodiment, a total of four first grooves 84 are provided so as to be arranged in the circumferential direction at substantially equal intervals (i.e., 90°).

The second groove 86 is formed to be recessed radially inward from the outer circumferential surface 82 of the outer race 80, and extends in the circumferential direction. In this embodiment, the second groove 86 is arranged at the center part in the axial direction of the outer face 80, and extends over the entire circumference of the outer circumferential surface 82 so as to intersect with the total of four first grooves 84.

In this embodiment, the compressed fluid introduced into the inner space S1 passes through the first grooves 84 formed at the outer circumferential surface 82 of the outer race 80, and is discharged to the outside space S2. Further, the second groove 86 is formed at the outer circumferential surface 82 of the outer race 80 so as to intersect with the first grooves 84.

According to this configuration, it is possible to arrange the first grooves 84 for passage of the compressed gas near the rotary shaft 13e, while eliminating the effect on the strength of the first bearing 78 due to the first grooves 84. As a result, it is possible to effectively prevent the entry of foreign matter into the inner space S1, while preventing the generation of noise from the first bearing 78 and realizing longer life of the first bearing 78.

Further, according to this embodiment, the first grooves 84 and second groove 86 can be easily formed by processing the outer circumferential surface 82 of the outer race 80, so the production costs of the motor 70 can be reduced.

Further, in this embodiment, the first grooves 84 are formed in a straight line in the axial direction, so it is possible to reduce the pressure loss of the compressed fluid passing through the first grooves 84. Accordingly, it is possible to discharge the compressed fluid introduced into the inner space S1 to the outside space S3, more efficiently.

Figure 7:
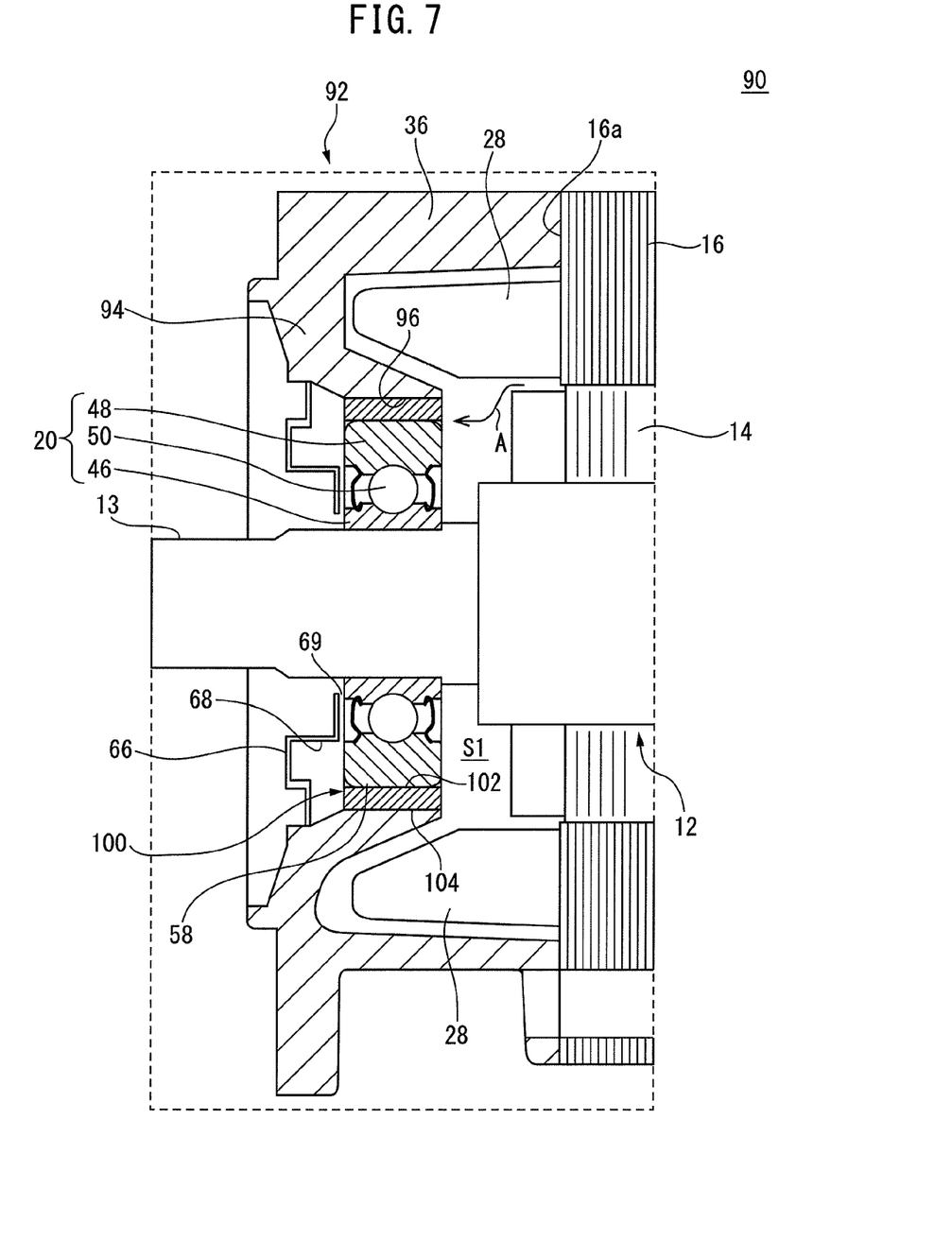
FIG. 7 is a partial enlarged view of a motor according to still another embodiment of the invention and corresponds to FIG. 2.
Figure 8:
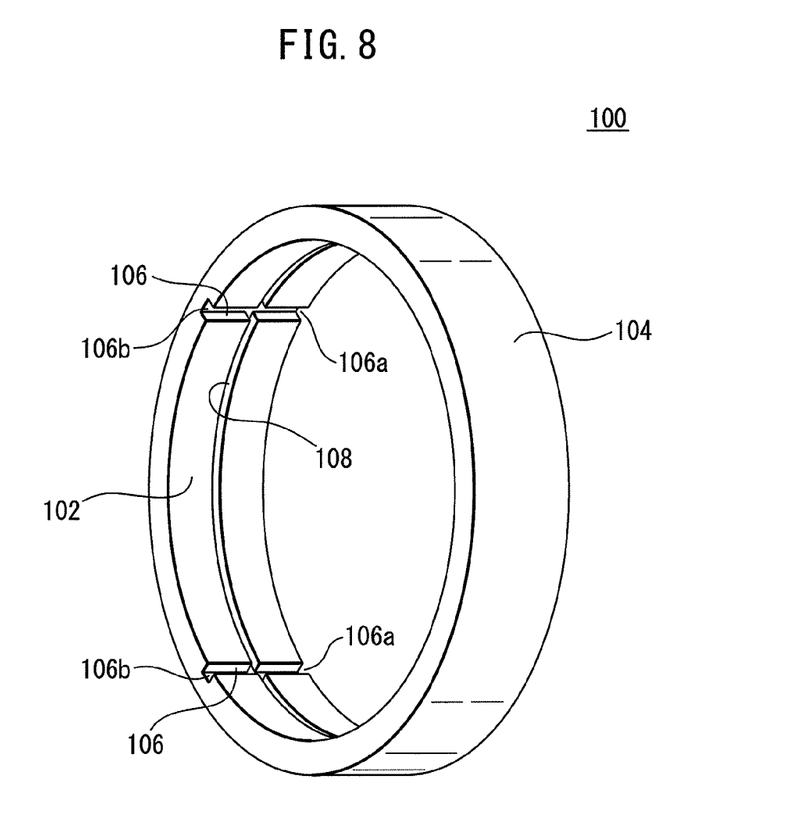
FIG. 8 is a perspective view of the annular member shown in FIG. 7.

Next, referring to FIG. 7 and FIG. 8, a motor 90 according to still another embodiment of the invention will be explained. The motor 90 according to this embodiment is different from the above-mentioned motor 10 in the following feature. The motor 90 further includes an annular member 100 arranged between a flange 94 of the front housing 92 and the first bearing 20.

Specifically, the annular member 100 is a circular ring-shaped member having an inner circumferential surface 102 and an outer circumferential surface 104 opposite the inner circumferential surface 102. The inner circumferential surface 102 surrounds the outer circumferential surface 58 of the outer race 48 from radially outside so as to contact the outer circumferential surface 58.

The first bearing 20 is supported by the inner circumferential surface 102 at radially inside of the flange 94. Thus, in this embodiment, the inner circumferential surface 102 of the annular member 100 functions as a bearing support surface for supporting the first bearing 20.

The flange 94 of the front housing 92 has a cylindrical inner circumferential surface 96 at its radially inner end. The inner circumferential surface 96 surrounds the outer circumferential surface 104 of the annular member 100 from radially outside, and contacts the outer circumferential surface 104 so as to support it. Due to this, the annular member 100 is fixed relative to the front housing 92, whereby the inner circumferential surface 102 of the annular member 100 is arranged to be immovable relative to the front housing 92.

The motor 90 according to this embodiment includes first grooves 106 and a second groove 108 which are formed at the inner circumferential surface 102 of the annular member 100. The first grooves 106 are formed to be recessed radially outward from the inner circumferential surface 102, and linearly extend in the axial direction from the axially rear end to the axially front end of the annular member 100.

Similar to the above-mentioned first grooves 62, the first grooves 106 are in fluid communication with the inner space S1 at their axially rear ends 106a, while are in the fluid communication with the outside space S2 at their axially front ends 106b through the above-mentioned space 68 and gap 69. In this embodiment, a total of four first grooves 106 are provided so as to be arranged in the circumferential direction at substantially equal intervals (i.e., 90°).

The second groove 108 is formed to be recessed radially inward from the inner circumferential surface 102 of the annular member 100, and extends in the circumferential direction. In this embodiment, the second groove 108 is arranged at the center part in the axial direction of the annular member 100, and extends over the entire circumference of the inner circumferential surface 102 so as to intersect with the total of four first grooves 106.

In the motor 90 according to this embodiment, the compressed fluid introduced into the inner space S1 passes through the first grooves 106 formed at the inner circumferential surface 102 of the annular member 100, and is discharged to the outside space S2. Further, at the inner circumferential surface 102 of the annular member 100, the second groove 108 is formed so as to intersect with the first grooves 106.

According to this configuration, it is possible to arrange the first grooves 106 near the rotary shaft 13, while eliminating the effect on the strength of the first bearing 20 derived from the first grooves 106. As a result, it is possible to effectively prevent the entry of foreign matter into the inner space S1, while preventing the generation of noise from the first bearing 20 and realizing longer life of the first bearing 20.

Further, according to this embodiment, the first grooves 106 and second groove 108 can be easily formed by processing the inner circumferential surface 102 of the annular member 100, so the cost of production of the motor 90 can be reduced.

Further, in this embodiment, the first grooves 106 are formed in a straight line in the axial direction, so it is possible to reduce the pressure loss of the compressed fluid passing through the first grooves 106. Accordingly, it is possible to more efficiently discharge the compressed fluid introduced into the inner space S1 to the outside space S3.

Note that, in the above-mentioned embodiments, a case was explained where both of the first groove 62, 84, 106 and second groove 64, 86, 108 were formed at either the outer circumferential surface 58, 82 of the first bearing 20, 78 or the bearing support surface 60, 76, 102.

However, the first groove 62, 84, 106 may be formed at one of the outer circumferential surface 58, 82 of the first bearing 20, 78 and bearing support surface 60, 76, 102, while the second groove 64, 86, 108 may be formed at the other of the outer circumferential surface 58, 82 of the first bearing 20, 78 and bearing support surface 60, 76, 102.

Specifically, in the embodiment shown in FIG. 1 to FIG. 4, the first grooves 62 may be formed at the bearing support surface 60, while the second groove may be formed at the outer circumferential surface 58 of the outer race 48. Further, in the embodiment shown in FIG. 7 and FIG. 8, the first grooves 106 may be formed at the inner circumferential surface 102 of the annular member 100, while the second groove 108 may be formed at the outer circumferential surface 58 of the outer race 48.

Further, in the above-mentioned embodiments, a case was explained where the first grooves 62, 84, 106 linearly extend in the axial direction. However, the first grooves may also extend from its axially rear end to its axially front end so as to be curved.

Further, in the above-mentioned embodiments, a case was explained where the outer circumferential surface 58, 82 of the first bearing 20, 78 and the bearing support surface 60, 76, 102 are all cylindrical. However, they may also be polygonal or elliptical or other shapes other than cylindrical ones.

Further, in the above-mentioned embodiments, a case was explained where only single second groove 64, 86, 108 is provided. However, a plurality of second grooves may be provided so as to be arranged in the axial direction.

Further, in the above-mentioned embodiments, a case was explained where the first bearing 20, 78 is a ball bearing. However, the first bearing 20, 78 may be e.g. a roller bearing. In this case, the second groove can be arranged at the axial direction position where the rollers and the raceway surface contact each other.

For example, when both ends in the axial direction of the roller are machined by a crowning process, and the center part in the axial direction of the roller contacts the raceway surfaces, one second groove may be arranged at the axial direction position corresponding to the center part in the axial direction of the roller.

On the other hand, when the center part in the axial direction of a roller is machined by a crowning process, and both ends in the axial direction of the roller contact the raceway surfaces, a total of two second grooves may be arranged at the positions in the axial direction corresponding to both ends of the roller.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

The invention claimed is:
1. A motor comprising:
   a rotor including a rotary shaft;
   a stator arranged at radially outward of the rotor;
   a bearing which supports the rotary shaft to be able to rotate;

a housing which supports the stator and defines an inner space which houses the rotor together with the stator, a bearing support surface arranged to be immovable relative to the housing, and surrounding an outer circumferential surface of the bearing so as to support the bearing, a first groove formed at the outer circumferential surface of the bearing or at the bearing support surface, the first groove being in fluid communication with the inner space at one end of the first groove and with an outside space of the housing at the other end of the first groove, the first groove being formed to make a compressed fluid, which is introduced into the inner space from an external fluid feed device, pass from the one end to the other end so as to be discharged from the other end to the outside space; and a second groove formed at the outer circumferential surface of the bearing or at the bearing support surface, the second groove extending in a circumferential direction of the rotary shaft so as to intersect with the first groove.

2. The motor according to claim 1, wherein the bearing support surface is formed at the housing.

3. The motor according to claim 1, further comprising an annular member arranged between the housing and the bearing, and including the bearing support surface at an inner circumference of the annular member.

4. The motor according to claim 1, wherein the first groove linearly extends in an axial direction of the rotary shaft.

5. The motor according to claim 1, wherein the second groove extends over the entire circumference of the outer circumferential surface of the bearing or the bearing support surface.

6. The motor according to claim 1, wherein both of the first groove and the second groove are formed at one of the outer circumferential surface of the bearing and the bearing support surface.

7. The motor according to claim 1, wherein the housing includes:

a first housing part fixed to one side of the stator in the axial direction; and a second housing part fixed to the other side of the stator in the axial direction, wherein the bearing is arranged at the one side of the stator in the axial direction, the second housing part is formed with an air hole which connects the inner space and the outside space so as to be in fluid communication with each other, the air hole introducing the compressed fluid into the inner space.

* * * * *